L. J. SCHNEIDER.
IMMERSIBLE HEATING UNIT.
APPLICATION FILED MAY 11, 1920.
1,369,475.
Patented Feb. 22, 1921.
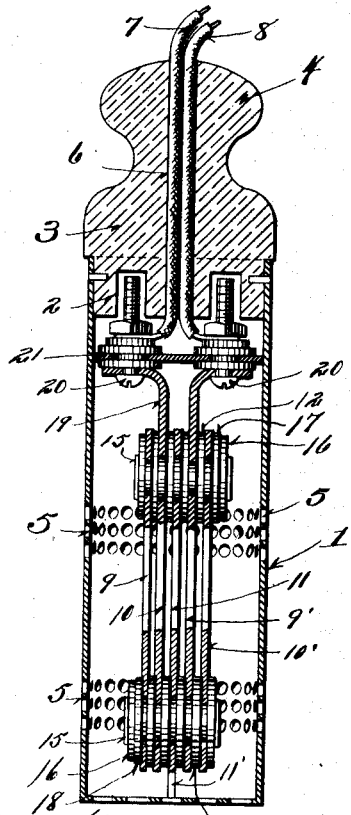
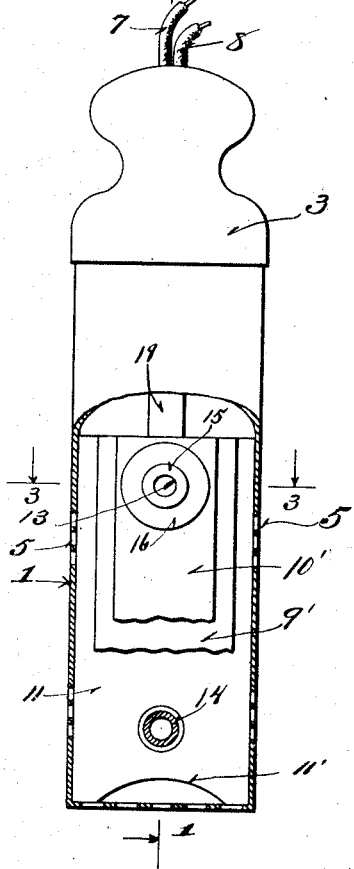
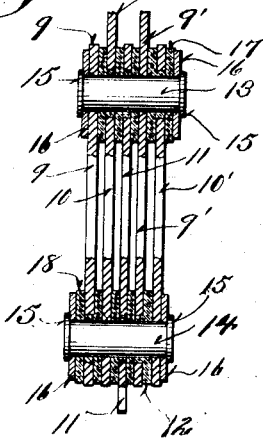
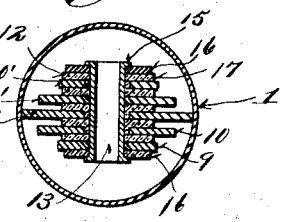
Inventor:
Louis J. Schneider

UNITED STATES PATENT OFFICE.

LOUIS J. SCHNEIDER, OF MILWAUKEE, WISCONSIN, ASSIGNOR OF ONE-HALF TO EDWIN W. STRAUSS, OF MILWAUKEE, WISCONSIN.

IMMERSIBLE HEATING UNIT.

1,369,475.  Specification of Letters Patent.  Patented Feb. 22, 1921.

Application filed May 11, 1920. Serial No. 380,593.

*To all whom it may concern:*

Be it known that I, LOUIS J. SCHNEIDER, a citizen of the United States, and resident of Milwaukee, in the county of Milwaukee and State of Wisconsin, have invented certain new and useful Improvements in Immersible Heating Units; and I do hereby declare that the following is a full, clear, and exact description thereof.

My invention relates to new and useful improvements in portable heating units, and pertains particularly to those devices which are adapted to be immersed in the liquid of a container to heat the same.

It is the primary object of this invention to provide an electric heating unit of this character in which the electric circuit is normally broken, but is automatically completed when the device is immersed so that the immersing liquid may be heated. In other words it is the main object of the invention to provide an electric heating unit which utilizes the liquid which is being heated as a portion of the electric circuit.

A further object of the invention is to provide a simply constructed article of this character which can be inexpensively manufactured and which, although constructed of a relatively few number of parts, will operate most efficiently.

With these general objects in view, the invention resides in the novel features of construction, combination and arrangement of parts which will be hereinafter more particularly described and claimed.

In the accompanying drawing:

Figure 1 represents a vertical longitudinal sectional view taken on the plane of the line 1—1 of Fig. 2.

Fig. 2 is an elevational view, partly in section, of the device.

Fig. 3 is a horizontal section on the plane of the line 3—3 of Fig. 2, and

Fig. 4 is a detail vertical sectional view through the heating element.

Referring more particularly to this drawing, it will be seen that the invention includes a substantially cylindrical casing 1 closed at one end and open at the other to receive the reduced cylindrical end 2 of a closure plug 3. The plug is also provided with a knob 4 whereby a handle for the heating unit is formed. The casing 1 has a plurality of inlet and outlet openings 5 formed both in its side wall and in its closed end to permit liquid to readily flow into and out of the same. Also the handle including the closure plug, its reduced end 2 and knob 4, is provided with an axial bore 6 through which current conducting wires 7 and 8 extend.

The casing 1 is designed to house a heating element, but it can be readily removed therefrom upon the removal of the plug 3. This element comprises a plurality of spaced plates 9, 10, 11, 9′ and 10′, which are spaced apart and have insulating washers 12 located therebetween. Adjacent their upper and lower ends these several plates, which are substantially rectangular, are provided with alined holes receiving upper and lower connecting sleeves 13 and 14 respectively.

As will be seen from Fig. 4, the conducting plates 9 and 9′ are connected with the sleeve 13 and insulated from the sleeve 14, whereas the plates 10 and 10′ are insulated from the sleeve 13 and disposed in engagement with the sleeve 14. The spacing plates 11, however, are insulated from both of the sleeves 13 and 14 as well as from the adjacent conducting plates. The several plates and the insulating washers 12 which separate the same are retained in rigid spaced apart relation by upsetting the opposite ends of the sleeves 13 and 14 as shown at 15. However, metallic washers 16 are interposed between the opposite ends 15 and the adjacent conducting plates, and at one end of the sleeve 13 between the washer 16 and the adjacent conducting plate 10′ is also disposed an insulating washer 17. A similar washer 18 is disposed on the sleeve 14 between the plate 9 and the adjacent washer 16.

The upper or inner ends of the plates 10 and 9′ are extended as indicated at 19 and connected with the conducting wires 7 and 8 respectively by means of binding screws 20. In other words, as shown in Fig. 1, these ends 19 are connected with and insulated from a circular centering plate 21 which is of a size and shape to engage the inner wall of the casing 1.

Since the binding screws 20 rigidly secure the ends 19 of the conducting plates to the centering plate 21, the heating element will be located centrally within the casing 1. A further centering means is procured by said spacing plate 11 which, as shown in Fig. 2, is of a width substantially equal to the inner diameter of the casing so as to engage the wall thereof and also the closed bottom end. That portion of the spacing plate 11 which is located at the closed end of the casing 1 is cut-out as at 11' so that the liquid in which the unit is immersed may readily circulate, circulation also being permitted through the sleeves 13 and 14.

In the use of this improved heating unit, assuming that the wires 7 and 8 have been connected with a suitable source of electric current, the casing 1 is immersed in the liquid to be heated. The electricity flows through the conducting wire 7, for instance, enters the heating element connected thereto and flows from the conducting plates 10 and 10' through the immersing liquid to the other conducting plates 9 and 9' and thence out of the unit through the other conducting wire 8. In other words, the electric circuit is completed through the immersing liquid and as the current passes therethrough the same is heated. With such devices as this the wires 7 and 8 may be continuously connected with a source of current and the heating element will remain inactive until the casing is immersed. Likewise there is no danger of current being conducted through the casing 1 since the same is thoroughly insulated, except when immersed, from the conducting plates.

Various changes may be made in the form and proportion and in the different details of construction of the several parts of the invention without departing from the principles thereof or sacrificing any of the advantages.

Claims:

1. A portable heating unit adapted to be immersed in a container of liquid and comprising a casing, a pair of spaced insulated flat conducting plates in the casing, and electric current conducting wires leading into the said casing and connecting with the plates, an electric circuit being completed through said plates when the unit is immersed whereby to heat the immersing liquid.

2. A portable heating unit adapted to be immersed in a container of liquid and comprising a casing, a pair of current conducting wires leading into said casing, a plurality of spaced plates in the casing, each alternate plate being insulated from the next adjacent plates and one of said conducting wires, and connected with the other conducting wire, an electric circuit being completed through said plates when the unit is immersed whereby to heat the immersing liquid.

3. A portable heating unit adapted to be immersed in a container of liquid and comprising a casing, a pair of current conducting wires leading into said casing, a plurality of spaced plates in the casing, each alternate plate being insulated from the next adjacent plates and one of said conducting wires, and connected with the other conducting wire, an electric circuit being completed through said plates when the unit is immersed whereby to heat the immersing liquid, said plates having liquid circulating openings therethrough.

4. A portable heating unit adapted to be immersed in a container of liquid comprising a casing, a pair of spaced insulated conducting plates disposed in the casing and spaced from the walls thereof, a spacing plate having the conducting plates secured thereto and insulated therefrom, said spacing plate being disposed in engagement with the wall of the casing to retain the other plates in position with respect thereto, and electric current conducting wires leading into said casing and connected with the conducting plates, an electric circuit being completed through said plates when the unit is immersed whereby to heat the immersing liquid.

5. A portable heating unit adapted to be immersed in a container of liquid comprising a casing, a pair of spaced insulated conducting plates disposed in the casing and spaced from the walls thereof, a transversely disposed centering plate positioned within and engaging the walls of said casing, means for rigidly connecting said conducting plates to said centering plate, and electric current conducting wires leading into said casing and connected with the conducting plates, an electric circuit being completed through said conducting plates when the unit is immersed whereby to heat the immersing liquid.

6. A portable heating unit adapted to be immersed in a container of liquid comprising a casing, a pair of spaced insulated conducting plates disposed in the casing and spaced from the walls thereof, a longitudinally positioned spacing plate having the conducting plates secured thereto and insulated therefrom, said spacing plate being disposed in engagement with the wall of the casing to retain the conducting plates in spaced relation thereto, a transverse centering plate disposed within said casing and engaging the walls thereof, means for rigidly securing the spacing and conducting plates to said centering plate, and electric current conducting wires leading into said casing and connected with the conducting plates, an electric circuit being completed to said conducting plates when the unit is immersed whereby to heat the immersing liquid.

In testimony that I claim the foregoing I have hereunto set my hand at Milwaukee, in the county of Milwaukee and State of Wisconsin.

LOUIS J. SCHNEIDER.